United States Patent [19]
Shen et al.

[11] Patent Number: 5,864,215
[45] Date of Patent: Jan. 26, 1999

[54] STEERING APPARATUS FOR CONTROLLABLY DISPLACING A STRUCTURE RELATIVE TO A FRAME MEMBER

[75] Inventors: Gon-Yen Shen, Brookfield; Alan Gayhart; Everett Kaelber, both of Sherman; David Eaton, Newtown, all of Conn.

[73] Assignee: Hughes Aircraft Company, Los Angeles, Calif.

[21] Appl. No.: 839,536

[22] Filed: Apr. 14, 1997

Related U.S. Application Data

[63] Continuation of Ser. No. 847,120, Mar. 6, 1992, abandoned.

[51] Int. Cl.⁶ .............................. G05B 19/19; B60R 1/08
[52] U.S. Cl. ........................ 318/560; 318/467; 318/470; 318/466; 74/501 M; 350/637; 350/605; 350/632; 350/877
[58] Field of Search .................................... 318/560–646, 318/466, 103, 101, 467, 468, 114; 350/637, 582, 634, 633, 636; 403/90, 124; 74/89.14, 89.15, 424.8 K, 425, 479; 359/874, 877

[56] References Cited

U.S. PATENT DOCUMENTS

| | | | |
|---|---|---|---|
| Re. 34,142 | 12/1992 | Fimeri | 74/89.14 |
| 4,134,065 | 1/1979 | Bauer et al. | 318/653 X |
| 4,151,757 | 5/1979 | Pitrat | 74/501 M |
| 4,857,919 | 8/1989 | Braswell | 340/870.36 |
| 4,904,921 | 2/1990 | DeVito et al. | 318/657 X |
| 4,915,493 | 4/1990 | Fisher et al. | 350/634 |
| 4,929,878 | 5/1990 | Hansen | 318/560 |
| 4,940,321 | 7/1990 | Yoshida | 350/633 |
| 4,940,322 | 7/1990 | Hamamoto et al. | 350/637 |
| 4,971,430 | 11/1990 | Lynas | 350/605 |
| 5,035,496 | 7/1991 | An | 350/605 |
| 5,042,932 | 8/1991 | Pent | 359/874 |
| 5,059,956 | 10/1991 | Iino | 340/705 |
| 5,080,492 | 1/1992 | Platzer, Jr. | 359/877 |
| 5,111,125 | 5/1992 | Barrs | 318/603 |
| 5,119,003 | 6/1992 | Lin et al. | 318/561 |
| 5,126,885 | 6/1992 | Gray | 359/841 |

OTHER PUBLICATIONS

R. Cochran & R. Vassar, "Fast Steering Mirrors in Optical Control Systems", SPIE vol. 1303, Advances in Optical Structure Systems (1990), pp. 245–251,.

M. Stier et al., "Prototype Secondary Mirror Assembly Design For The Space Infrared Telescope Facility", IEEE Transactions on Nuclear Science, vol. 36, No. 1, Feb. 1989, pp. 903–915.

L. Germann et al., "Fine–Steering Mirror Technology Supports 10 Nanoradian Systems", Optical Engineering, Nov. 1990, vol. 29, No. 11, pp. 1351–1359.

S. Forman et al., "Laser Radar Beam Steering Mirrors", Optical Engineering, Nov. 1990, vol. 29, No. 11, pp. 1342–1350.

*Primary Examiner*—Paul Ip
*Attorney, Agent, or Firm*—W. C. Schubert; W. K. Denson-Low

[57] ABSTRACT

A steering mechanism (17) in which axial motion of an optical structure (12) is constrained electrically through a closed loop servo control system. The steering mechanism includes three magnetic actuators (19*a*, 19*b*, 19*c*) each having a push rod (20*a*, 20*b*, 20*c*) magnetically coupled thereto for being translated by the magnetic actuator along a translation axis (A). Each of the push rods has an end coupled to a peripheral region (1*a*, 1*b*, 1*c*) of the optical structure for exerting a displacing force thereon in response to the push rod being translated along the translation axis. A non-contact displacement sensor (10*c*) provides a feedback signal for the closed loop servo control system.

2 Claims, 5 Drawing Sheets

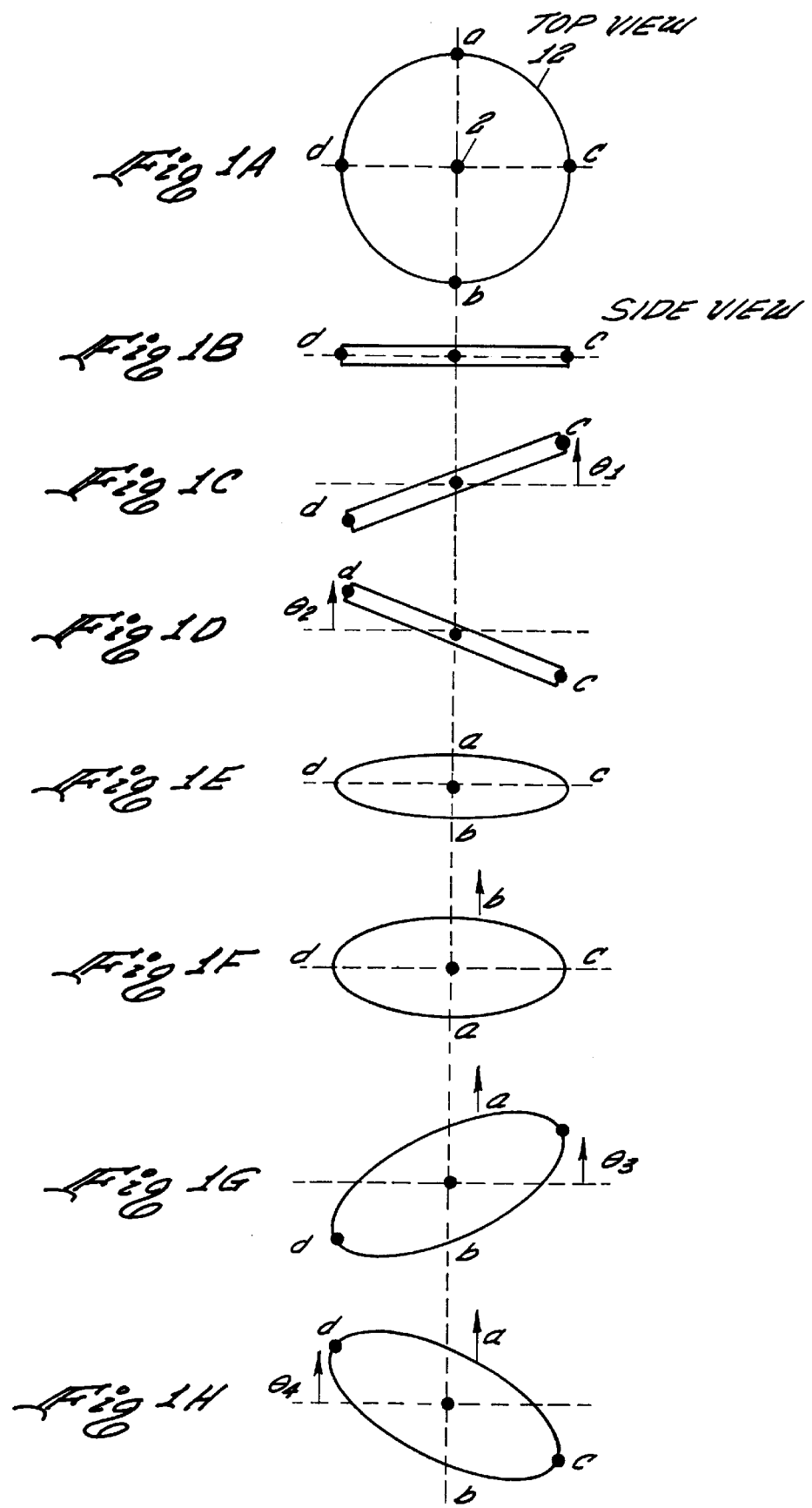

STEERING APPARATUS FOR CONTROLLABLY DISPLACING A STRUCTURE RELATIVE TO A FRAME MEMBER

This application is a continuation of application Ser. No. 07/847,120 filed on Mar. 6, 1992 now abandoned.

This invention was made with Government support under contract No. N60921-88-C-0014 awarded by the United States Navy. The Government has certain rights in this invention.

FIELD OF THE INVENTION

This invention relates to steering mechanisms for steering or changing an angular orientation of a structure, such as a mirror.

BACKGROUND OF THE INVENTION

Conventional large angle steering mirrors are typically implemented with gimballed systems. Gimballed systems often utilize a mechanical frame having two perpendicularly intersecting axes of rotation. However, conventional gimballed systems require substantial amounts of power to operate, and furthermore are bulky and heavy.

Flexure mounted steering mechanisms were developed to overcome the problems associated with gimballed systems. However, flexure mounted steering mechanisms have stringent angular motion limitations, and cannot readily satisfy specific requirements pertaining to angular motion speed and dynamic range, where dynamic range is defined as a ratio of a maximum angle to a minimum angular accuracy.

It is an object of this invention to provide a steering mechanism for a structure, such as a mirror, that overcomes the problems inherent in gimballed and flexure-mounted steering mechanisms.

SUMMARY OF THE INVENTION

In accordance with the present invention, a large angle, precision fast steering mechanism constrains axial motion of an optical structure through a closed-loop servo control system. The steering mechanism utilizes a plurality of magnetic actuators, each including a corresponding push rod, permanent magnet, actuator coil, position sensor, and closed-loop servo circuit. One end of each push rod is magnetically coupled, via the permanent magnet, to the actuator coil and a supporting frame. The opposite end of the push rod is coupled to a peripheral region of the steerable optical structure. The position sensor is co-located with a corresponding magnetic actuator and generates a feedback signal representative of a displacement of a corresponding push rod. The feedback signal is inputted into a corresponding closed-loop servo circuit, in conjunction with a command signal that is representative of a desired optical structure angular position. The servo circuit outputs an actuator control signal that is a function of the difference between the command signal and the feedback signal. The actuator control signal is inputted into the corresponding magnetic actuator. The position of the optical structure is changed by the push rods until the desired angular position is attained. Each magnetic actuator also includes ball bushings in order to constrain the magnetic actuator against transient motions due to, for example, activation of the magnetic actuator and resulting mechanical vibrations. The ball bushings also provide support against radial translation.

The large angle precision fast steering mechanism of the present invention exhibits the following characteristics:

(a) a large optical structure angular motion (dynamic range);

(b) a large optical structure angular motion per time period;

(c) an accurate alignment of the optical structure with a desired angular position;

(d) a low optical structure distortion; and (e) a low power consumption.

BRIEF DESCRIPTION OF THE DRAWINGS

The above set forth and other features of the invention are made more apparent in the ensuing Detailed Description of the Invention, when read in conjunction with the attached Drawing, wherein:

FIG. 1.A. is a top view of a mirror that is controllably displaced by the large angle precision fast steering mechanism of the present invention;

FIG. 1.B. is a side view of the mirror of FIG. 1.A. with no angular displacement;

FIGS. 1.C.–1.D. each show a side view of the mirror of FIG. 1A having different angular displacements;

FIGS. 1.E.–1.H. each show an elevational view of the mirror of FIG. 1.A. having different angular displacements;

FIG. 2C shows a cross-sectional view of the steering mechanism of FIG. 2a taken along the planes 2C—2C of FIG. 2a;

DETAILED DESCRIPTION OF THE INVENTION

The steering mechanism of the present invention is suitable for accurately and rapidly steering or positioning a number of different types of structures. The invention is described herein in the context of an optical structure, specifically a mirror. In other embodiments, and by example, a lens or a grating may be positioned by the steering mechanism. However, it should be realized that the steering mechanism of the invention may be employed for accurately steering a variety of structures, other than optical structures and, in particular, other than mirrors.

FIG. 1.A. illustrates a top view of a mirror 12 that is steered by the mechanism of the invention. Reference points a–d are equidistant from one another and from centerpoint 2 of mirror 12. FIG. 1.B. illustrates a side view of mirror 12 with reference points b, c and d being visible. FIGS. 1.C.–1.H. illustrate typical angular positions ($\Theta_1$, $\Theta_2$, $\Theta_3$ and $\Theta_4$) to which mirror 12 may be steered in order to redirect optical radiation to a certain pre-determined location or target. It should be realized that the mirror need not be symmetrical as shown in FIGS. 1.A.–1.H. Furthermore, it should be noted that no center pivot or flexure is provided or required for the mirror 12.

Figure 2A:
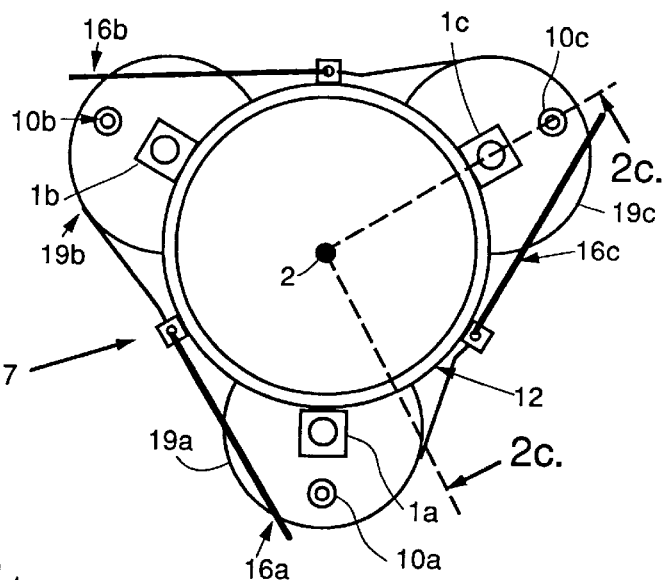
FIG. 2a shows a top view, not to scale, of the steering mechanism of the present invention.

FIG. 2a illustrates a steering mechanism 17 constructed in accordance with the invention. Mechanism 17 includes three magnetic actuators 19a, 19b and 19c for positioning mirror 12 to predetermined angular positions, some of which are shown in FIGS. 1.B.–1.H. Mechanism 17 also includes tangential flexures 16a, 16b and 16c for providing lateral stability.

Figure 2B:
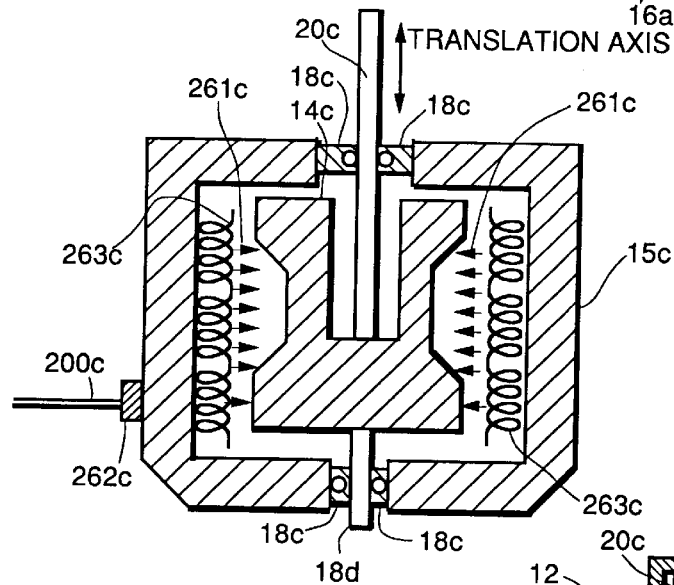
FIG. 2b shows an actuator magnet and associated push rod supported by a magnetic field.
Figure 2C:
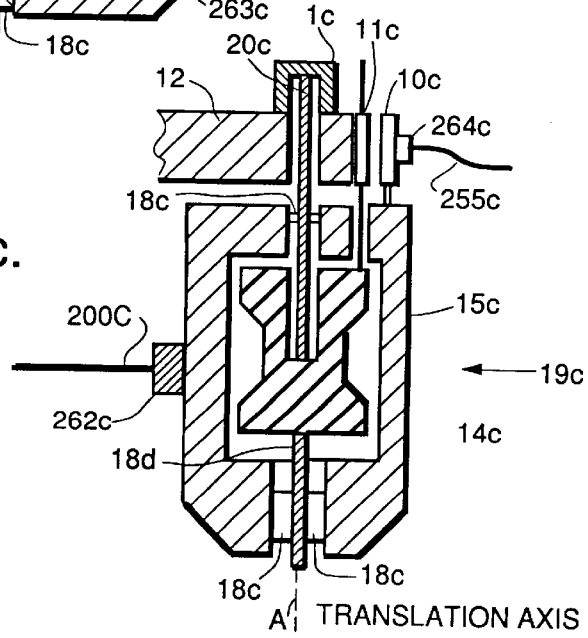

FIG. 2C shows a cross-sectional view of mechanism 17 of FIG. 2a taken along the planes 2C—2C of FIG. 2a, and depicts in cross-section the actuator 19c. The ensuing description refers to actuator 19c and associated components, however, the description is also applicable to actuators 19a and 19b and respective associated components. Actuator 19c includes an actuator permanent magnet 14c which is located within a housing 15c, a push rod 20c, an electrode 262c, front and rear ball bushings 18c, and rearward extension 18d. One end of push rod 20c is fixed to actuator magnet 14c and the other end is coupled to a peripheral region 1c of mirror 12. The housing 15c, and the actuator coils contained therein, are fixed to a frame (F). The mirror is displaced relative to the frame by the actions of push rods 20a, 20b, and 20c, which are coupled to the mirror at points 1a, 1b, and 1c, respectively. Points 1a, 1b, and 1c are approximately equidistant from one another, although for other embodiments this may not be the case.

Referring now to FIG. 2b, when a Torque Command Signal 200c is applied to electrode 262c, a magnetic field 261c is produced between actuator magnet 14c and coils 263c. Magnetic field 261c exerts a displacing force on actuator magnet 14c and push rod 20c. The displacing force exerted upon actuator magnet 14c and push rod 20c results in a translation of push rod 20c along a translation axis. This translation axis is aligned in parallel with translation axes of push rods 20a and 20b. The translation of push rod 20c provides a displacing force on mirror 12. Push rod 20c may be considered to be "floating" in that it is fixed to actuator magnet 14c, which in turn is supported by magnetic field 261c. Push rod 20c and rearward extension 18d slidingly engage and are supported by front and rear ball bushings 18c. By virtue of this arrangement there is no "hard" or rigid mechanical connection or coupling between push rod 20c, housing 15c, and the frame, but rather a "soft" magnetic coupling. This "soft" magnetic coupling minimizes dynamic coupling between the mirror and the frame. Furthermore, in that push rod 20c is connected to mirror 12, there is no repetitive engaging and disengaging of push rod 20c with mirror 12. This reduces dynamic coupling with respect to the motion of push rod 20c. The "soft" magnetic coupling between push rod 20c and housing 15c, and the reduction of dynamic coupling between push rod 20c and mirror 12, substantially reduces coupling of transient motions into mirror 12. This enables rapid mirror motions, while preserving mirror optical quality, both during and after steering of mirror 12.

One suitable embodiment of actuator 19c is available from BEI Motion Systems Company, Kimco Division, Model No. LA 16-19. This actuator utilizes a SmCo (Samarium Cobalt) permanent magnet as the actuator magnet 14c. Push rod 20c, when used in conjunction with this actuator, is capable of attaining a maximum extension of ±0.15 inches, and is capable of being translated along the translation axis (A) at a maximum rate of 30 inches/second (see FIG. 2C).

Actuator magnet 14c, or push rod 20c, is also provided with the rearward extension 18d which slidingly engages ball bushings 18c provided at a rearward end of housing 15c. In conjunction with front ball bushings 18c that slidingly engage the push rod 20c, this arrangement constrains actuator magnet 14c and, hence, push rod 20c, against transient motions due to, for example, activation of actuator 19c and resulting mechanical vibrations. This arrangement also constrains the push rod 20c against radial motion. As a result, push rod 20c movement is constrained to be only along the translation axis (A).

Figure 4:
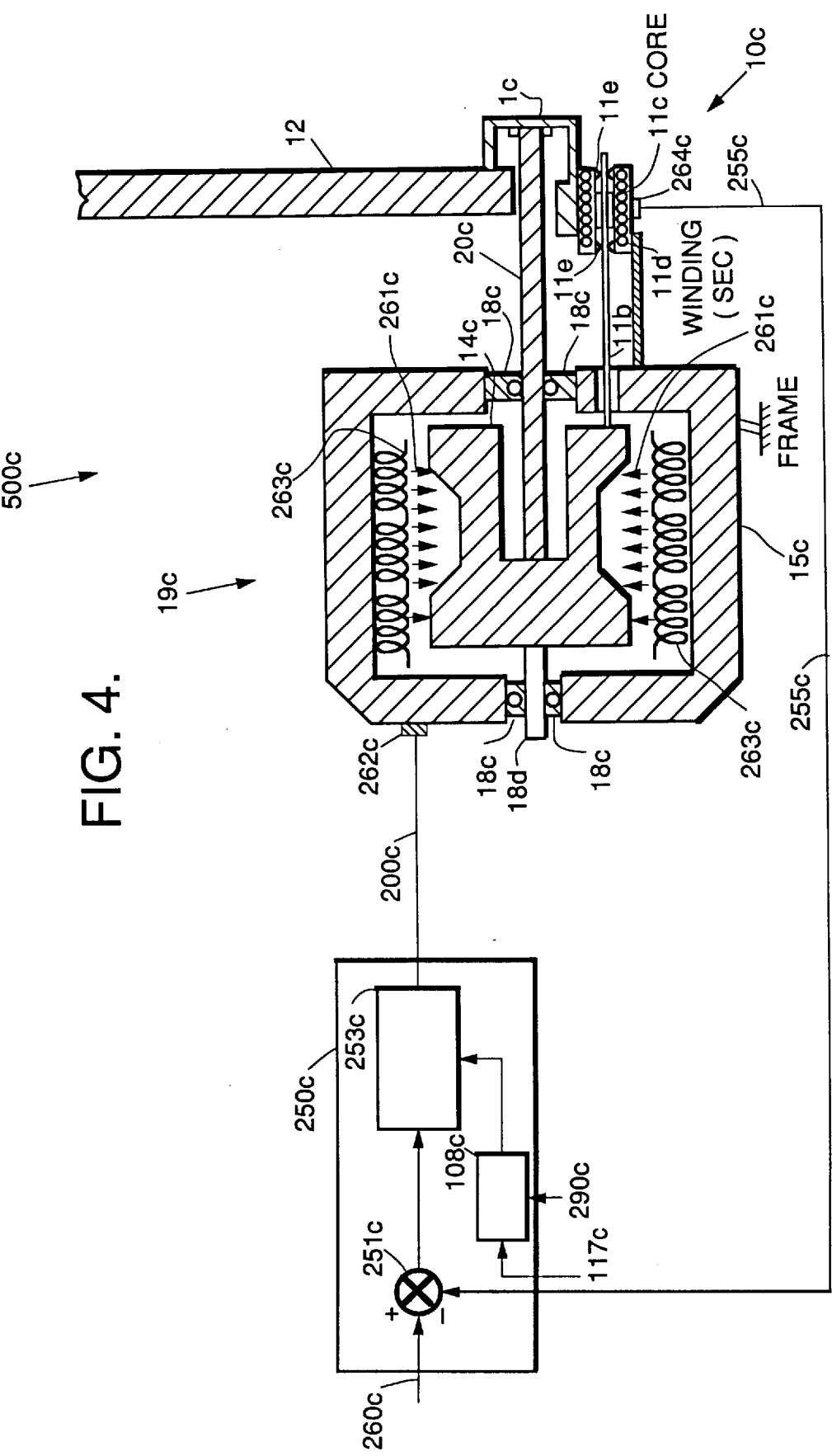
FIG. 4 is a detailed block diagram of an actuator subsystem utilized by the steering mechanism of the invention.

A motion feedback sensor 10c is preferably a non-contacting, differential device and provides linear operation and high accuracy. Furthermore, the differential characteristics of the device provide low noise, large dynamic range, and high accuracy. In a presently preferred embodiment, sensor 10c is a Linear Variable Differential Transformer (LVDT) that is utilized to monitor a position or displacement of mirror 12 relative to actuator 19c. As is also seen in FIG. 4, LVDT sensor 10c is located on or closely adjacent (co-located) with actuator 19c. Core 11c within LVDT sensor 10c is coupled to a shaft 11b that is supported by jewelled bearings 11e. As a result, the shaft 11b, and core 11c, move along an axis that is parallel to the translation axis. This motion is in response to the displacement of actuator magnet 14c. A primary winding of LVDT sensor 10c is excited with an AC (alternating current) carrier signal, for example nine KHz. As core 11c moves a secondary winding 11d of LVDT sensor 10c outputs a signal, at electrode 264c, having a magnitude that varies with the movement of core 11c. The output of the secondary winding 11c is demodulated to produce a D.C. (direct current) feedback signal 255c (see FIG. 4). This D.C. feedback signal is proportional to an extension of push rod 20c, and thus also represents a corresponding displacement of mirror 12. One suitable embodiment of LVDT sensor 10c is available from Schaevitz Engineering, U.S. Route 130 & Union Avenue, Pennsauken, N.J., Model 249XS-B.

Figure 3:
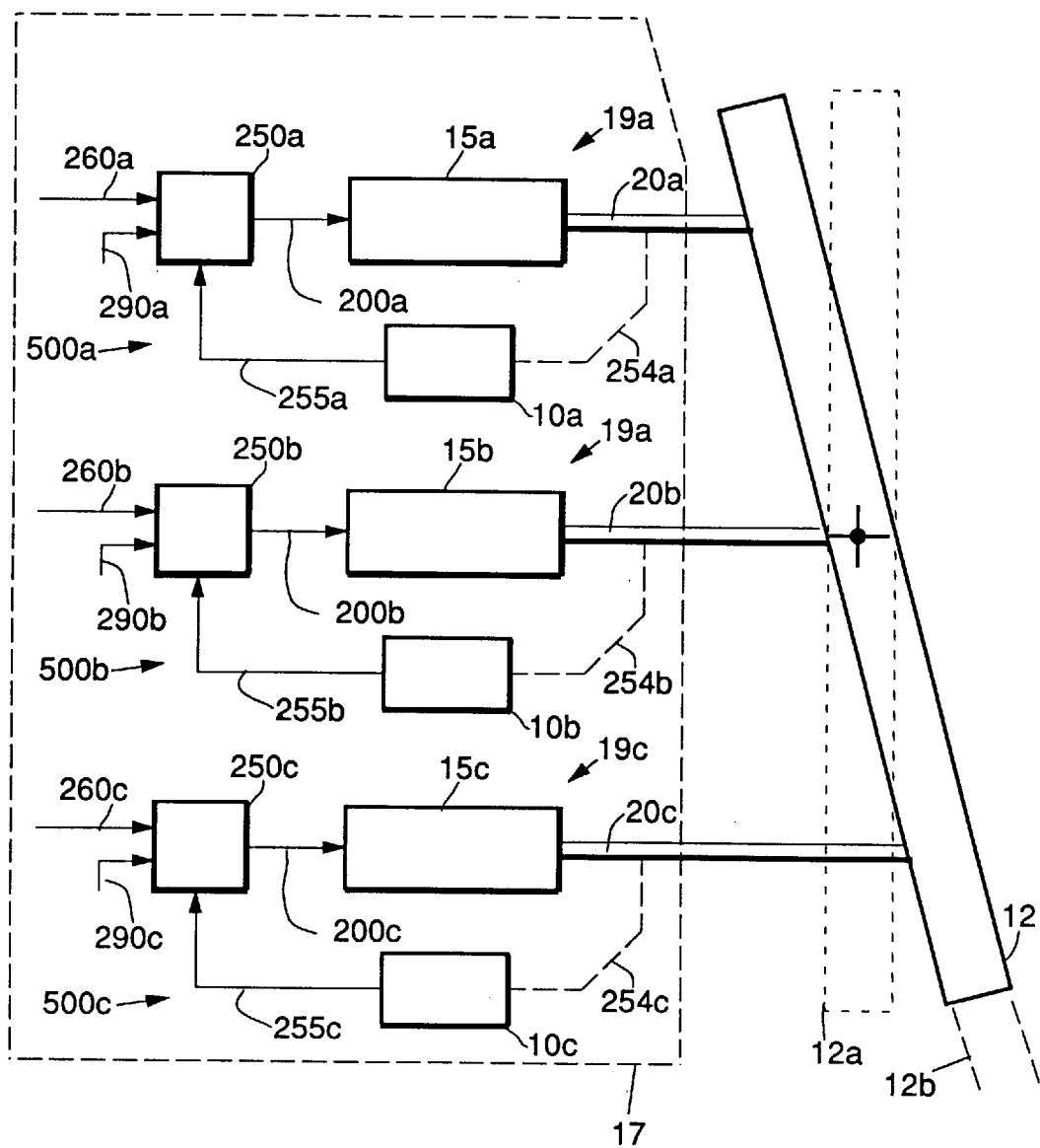
FIG. 3 is a detailed block diagram of the steering mechanism of the invention.

FIG. 3 shows a block diagram of the closed-loop steering mechanism 17 of the present invention. Actuator subsystems 500a, 500b and 500c receive Position Command Signals 260a, 260b and 260c, respectively. Push rods 20a, 20b and 20c are extended in accordance with the magnitude of the respective Torque Command Signals 200a, 200b and 200c and exert a displacing force onto the peripheral regions 1a, 1b and 1c of mirror 12 in order to move mirror 12 from position 12a and 12b. Mechanical connections 254a, 254b and 254c represent displacement sensing functions of sensors 10a, 10b and 10c, respectively. Sensors 10a, 10b and 10c sense a magnitude of displacement of push rods 20a, 20b and 20c along their respective translation axes. By example only, mirror 12 has a diameter of 45 millimeters, and is displaced a maximum of ±0.13 radians in two axes.

Figure 5:
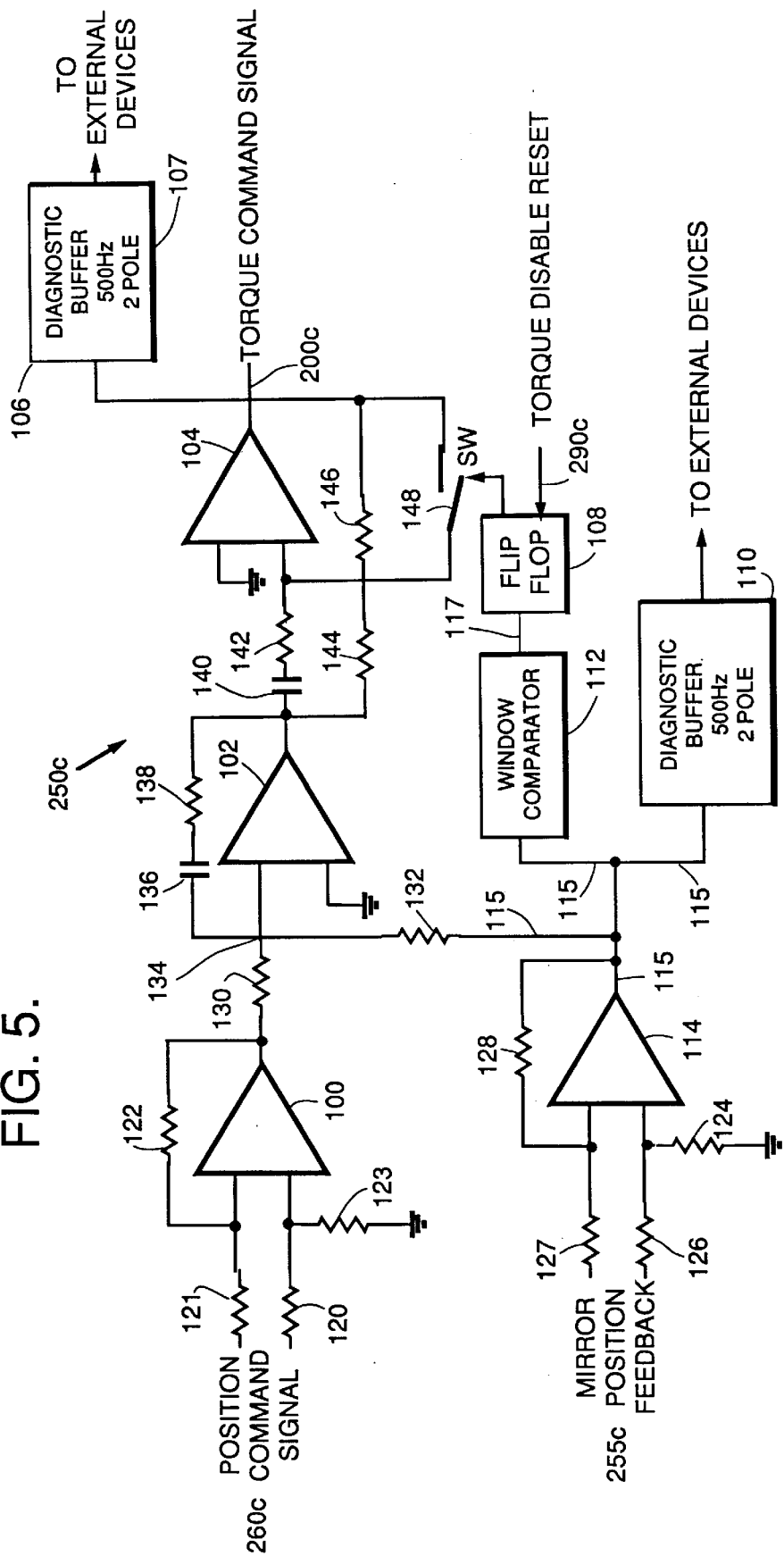
FIG. 5 is a schematic diagram of a servo circuit utilized by each actuator subsystem.

FIG. 4 illustrates in block diagram form the actuator subsystem 500c. FIG. 5 is a schematic diagram of servo circuit 250c utilized by actuator subsystem 500c. Servo circuits 250a and 250b, as shown in FIG. 3, are identical to servo circuit 250c shown in FIG. 5.

The ensuing description incorporates elements of FIGS. 4 and 5 and describes the operation of actuator subsystem 500c. The description is also applicable to actuator subsystems 500a and 500b, as shown in FIGS. 3 and 4.

Position Command Signal 260c is an analog voltage and represents an externally generated, desired position of mirror 12. Position Command Signal 260c is inputted into error detector 251c of electronic servo circuit 250c. Mirror Position Feedback Signal 255c, which is a function of a current position of mirror 12 as measured by sensor 10c, is also inputted into error detector 251c. Error detector 251c is comprised of amplifiers 100, 114 and resistors 120–124, 126–128, 130 and 132. The outputs of amplifiers 100 and 114 are summed at node 134, via resistors 130 and 132, respectively. Node 134 is maintained at a virtual ground potential. The output of amplifier 102 is equal to the difference between Position Command Signal 260*c* and Mirror Position Feedback Signal 255*c*. Error detector 251*c* outputs an error signal 252*c* which represents a difference between a current mirror 12 angular position and a desired angular position, as indicated by Position Command Signal 260*c*. If the magnitude of Position Command Signal 260*c* equals the magnitude of Mirror Feedback Signal 255*c*, error signal 252*c* has a magnitude of zero and indicates that the associated push rod 20*c* is located at a desired extension. Controller circuit 253*c* converts error signal 252*c* into Torque Command Signal 200*c* which is inputted into actuator 19*c* via electrode 262*c*. Controller circuit 253*c* includes amplifiers 102 and 104, switch 148, capacitors 136 and 140, and resistors 138, 142, 144 and 146. Amplifier 102, capacitors 136 and 140, and resistors 138, 142, 144 and 146 form a loop compensation network. The values of capacitors 136 and 140 and resistors 138, 142, 144 and 146 are chosen so as to produce optimum gain and phase frequency responses. The output of amplifier 102 is inputted into amplifier 104 via capacitor 140 and resistor 142. The output of amplifier 104 is the Torque Command Signal 200*c* which is inputted into actuator 19*c* via electrode 262*c*. If the magnitude of Torque Command Signal 200*c* is zero, there is no acceleration of push rod 20*c*.

Amplifier 114 outputs a signal 115 that is a function of Mirror Position Feedback Signal 255*c*. Signal 115 is inputted into an optional diagnostic buffer 110, which is configured as an active 2-pole low pass filter with a 500 Hz 3-dB bandwidth. The output of diagnostic buffer 110 may be utilized by an external system (not shown) for storage and processing. The output 115 of amplifier 114 is also inputted into window comparator 112. Window comparator 112 defines a predetermined range that corresponds to the dynamic range of the mirror's angular motion. If output signal 115 is within a predetermined range, window comparator 112 outputs bi-state signal 117 that sets flip-flop 108. If bi-state signal 117 has a logic "high" level, flip-flop 108 outputs a logic "high" output signal 117 that closes switch 148, thus shorting amplifier 104's input to the output. The closure of switch 148 causes Torque Command Signal 200*c* to have zero magnitude. Torque Disable Reset Signal 290*c*, which is inputted from a peripheral device (not shown), resets flip-flop 108 thereby causing switch 148 to open.

Torque Command Signal 200*c* is also inputted into an optional diagnostic buffer 106 that includes a 2-pole active low pass filter having a 500 Hz 3-dB bandwidth. The output of the optional diagnostic buffer 106 may be inputted into the external system (not shown) for processing and storage.

While a preferred embodiment of the invention has been disclosed in detail, it should be understood by those skilled in the art that various modifications may be made to the illustrated embodiment without departing from the scope of the invention. For example, the position feedback sensors 10*a*, 10*b* and 10*c* may be other than LVDTs. Also, the servo circuitry may be provided in other suitable configurations while still obtaining the same result. Also, more than three actuator assemblies may be employed. The invention is thus not to be construed to be limited only to the disclosed embodiment, but it is instead intended to be limited only as defined by the appended claims.

What is claimed is:

1. A steering apparatus for controllably displacing a structure relative to a frame member, comprising:

a plurality of actuator means, each of said plurality of actuator means including an elongated member that is magnetically coupled to said frame member, each elongated member being adapted to float along a translational axis and being translated by said actuator means along its translation axis, each of said elongated members having an end coupled to said structure for exerting a displacing force thereon in response to said elongated member being translated along said translation axis.

2. A system comprising a mirror; a frame; and mirror positioning means for controllably displacing said mirror relative to said frame, said mirror positioning means including a plurality of actuators, each one of said actuators including:

an elongated member having one end coupled to said mirror; and moving means, secured to said frame and magnetically coupled to its associated member, for causing its associated member to move in a translational axis when actuated, wherein each elongated member is adapted to float along its translational axis, whereby said mirror is magnetically coupled to said frame.

* * * * *